Patented Jan. 25, 1949

2,460,187

UNITED STATES PATENT OFFICE 2,460,187

COATING COMPOSITION COMPRISING AN AMIDE-ALDEHYDE RESIN AND A POLY-ESTER OF AN ALPHA-ALKYL ETHER OF GLYCEROL AND A DICARBOXYLIC ACID AS PLASTICIZER

Eugene W. Moffett, Milwaukee, Wis., assignor to Pittsburgh Plate Glass Company, Allegheny County, Pa., a corporation of Pennsylvania No Drawing. Application March 7, 1946,
Serial No. 652,807

19 Claims. (Cl. 260—31.4)

The present invention relates to the plasticization of synthetic resins and it has particular relation to the plasticization of soluble grades of aminoplast resins obtained by the condensation of amides of carbonic acid or cyanuric acid such as urea and melamine with an aldehyde such as formaldehyde.

Objects of the invention include the provision of plasticizers for resins of the foregoing type which are of low volatility, high compatibilty with the resin, highly effective as plasticizers, soluble in inexpensive solvents for the resin, and which form plasticized compositions of high gloss, of high resistance to decoloration and decomposition by heat and high resistance to the action of alkalies, greases, or the like agencies.

These and other objects of the invention will be apparent from consideration of the following specification and the appended claims.

Heretofore, certain resinous products obtained by the condensation of formaldehyde and certain amides of weak di- or tribasic organic acids have enjoyed extensive commercial use. Condensation products of formaldehyde and amides such as urea and melamine are examples of the class. Preferably these are of the type soluble in non-aqueous solvents and may embody groups such as butyl groups introduced by effecting the condensation of formaldehyde and the amide in the presence of the alcohol. Resins from these bodies are characterized by high heat stability, excellent color, and are relatively inexpensive to produce. However, films obtained by coating surfaces to be protected with solutions of such resins have not been satisfactory because the resins were quite brittle and did not have sufficient degree of flexibility or adhesion.

In order to improve these properties it has been proposed to incorporate into the resins or into appropriate solutions of the resins modifiers termed "plasticizers" adapted to increase flexibility and adhesion. However, in the prior art no completely satisfactory plasticizer for these resins has been obtained. Among the compounds tested for the purpose have been certain esters of lower glycols and dibasic acids. Such compounds embody a very large class, many members of which have been previously prepared or which are theoretically possible. Among the members of the group may be included the polyesters of ethylene, diethylene and propylene glycols. Other compounds which have been proposed as plasticizers of urea-formaldehyde or melamine-formaldehyde resins include N-p-toluenesulfonylethanol amines (U. S. Patent No. 2,201,028), blown oil alkyds (U. S. Patent No. 2,112,556), and maleic and fumaric acid esters of polyhydroxy alcohols (U. S. Patent No. 2,166,542).

Of the various compounds suggested, some were incompatible with the resin or insoluble in the solvent of the resin. Some did not plasticize the resin or were poor in gloss or were unstable or lacking in resistance to greases or alkalies. Some also were unstable or tended to discolor at elevated temperatures such as are often encountered in baking the films or during service. In many cases the proposed plasticizers were volatile and were likely to evaporate off relatively rapidly during baking operations or more slowly upon prolonged exposure.

Particular difficulty has been experienced in obtaining a plasticizer capable of withstanding baking temperatures up to 400° F. and thereabouts, often desirable to harden the films. Under such conditions many of the plasticizers evaporated or tended to discolor. In many instances evaporation or discoloration occurred at lower temperatures if exposures were prolonged.

Probably the least objectionable of all of the plasticizers heretofore proposed for urea-formaldehyde or melamine-formaldehyde resins have been certain oil modified alkyd resins. These have enjoyed considerable use for certain purposes. However, even these compounds have been far from satisfactory because they were required in very large amounts adequately to plasticize the resins. A minimum seems to have been approximately 60 parts by weight for each 40 parts of the resin plasticized. Therefore in a sense the resin would appear to be a modifier of the plasticizer base.

In my copending application filed of even date herewith and entitled Protective coating compositions, Serial No. 652,805, are disclosed as plasticizers of urea-formaldehyde or melamine-formaldehyde resins, a class of polyesters of the alkyd type embodying certain ether type glycols, such as dipropylene glycol, as the dihydric component of the ester and a dicarboxylic acid of relatively high molecular weight as the acid component. These compounds are excellent plasticizers of urea-formaldehyde or melamine formaldehyde resins and are free or at least relatively free of all or most of the objectionable features attending the use of the plasticizers previously employed in these resins.

In a second application also of even date herewith and entitled Plasticization of amine-aldehyde resins are disclosed the use of polyesters of 2-ethyl cyclohexanediol-1,3 and dicarboxylic acids as plasticizers of resinous condensates of formaldehyde and amides such as urea and melamine, the condensates being of the type soluble in non-aqueous solvents. Solutions of the plasticizers and resins are very satisfactory for coating purposes.

The present invention is based upon the discovery that, in like manner, the polyesters of alkyl alpha-glyceryl ethers and the dibasic acids of high or medium weight are also highly satisfactory as plasticizers of urea-formaldehyde or melamine-formaldehyde resins.

The esters contemplated by the present invention may be prepared by any of the conventional procedures employed in the preparation of other esters or polyesters. A convenient process involves heating together a mixture of the alkyl alpha-glyceryl ethers and the dibasic acid or acids in a suitable container and preferably in the presence of a refluxing solvent adapted to remove the water formed or present, from the reaction zone. In accordance with a second method of procedure termed "fusion method," the solvent is omitted and the water is removed by sweeping the reaction mixture with an inert gas such as a carbon dioxide or nitrogen. Normally a slight molar excess of alkyl alphaglyceryl ether is employed in the reaction in order to assure a low acid value of the resultant polyester. The excess will be within a range of 10 or 20 per cent.

The reaction is conducted at an appropriate temperature, for example 150° C., which temperature should be increased as the reaction proceeds, in order to eliminate water of reaction. The presence of this water in the vapors given off from the reaction constitutes a criterion of the necessary conditions in the reaction zone. So long as water is given off the temperature of reaction is adequate and the reaction is still incomplete. Completion of the reaction is further evidenced by the decrease in the acid value of the product. Preferably reaction is conducted until water substantially ceases to pass over and the acid value has been reduced to 40 or below. Products of an acid value of 5 to 75 or even above are contemplated. Of course, reaction should not be continued to such a point as to cause gellation or solidification of the reaction mixture.

After the esterification has proceeded sufficiently far, as evidenced by such criteria as above described, the product may be partially or completely cooled and aromatic solvents such as toluene or xylene be added in order to thin the polyesters to the point at which they can be handled easily and economically. In place of aromatic solvents or solvents containing aromatic compounds, other solvents such as the alkyl ethers of glycols, e. g. monohydric methyl, ethyl or butyl ether of ethylene glycol may be employed. Ketonic solvents such as diacetone alcohol or cyclohexanone may also be employed.

Dibasic acids such as may be employed in preparing the polyesters, as previously indicated, should be of relatively high molecular weight, for example, they should contain six or more carbon atoms. Such acids include cyclic acids such as phthalic acid (normal, iso or tere) or di-, tetra- or hexa-hydro phthalic acid, 3,6-endomethylene-delta-4-tetrahydrophthalic acid. They also include open chain acids of relatively high molecular weight, such as adipic acid, pimelic acid, azaleic acid, suberic acid, sebacic acids or other acids containing even up to 18 or 19 carbon atoms. Mixtures of these acids in various proportions is also contemplated and certain mixtures which are particularly effective will be more fully described hereinafter. The term "acids" also includes anhydrides of the acids.

In the alkyl alpha-glyceryl ethers, the alkyl group should contain at least four carbon atoms and may contain 5, 6, 7, 8, 9, 10 or even more carbon atoms in straight or branched chains. The compounds containing the longer chains in the alkyl group appear to be more effective than the ethers containing lower chains in the alkyl group.

Examples of alkyl alpha-glyceryl ethers which may be employed in the preparation of polyesters for use in the plasticization of urea-formaldehyde and melamine-formaldehyde resins include alpha-glyceryl n-butyl ether, alpha-glyceryl amyl ether, alpha-glyceryl 2-ethylhexyl ether, alpha-glyceryl n-hexyl ether, alpha-glyceryl lauryl ether, alpha-glyceryl steryl ether and others. Very long chain lengths in the alkyl groups tend to decrease grease resistance in the resins plasticized by the polyesters but this is not always objectionable.

Various methods of preparation of the alkyl alpha-glyceryl ethers are feasible. The Williamson method may be applied by reacting an appropriate sodium alcoholate with alpha-glyceryl-mono-chlorohydrin.

The reaction involved in the preparation of the polyester may be represented by the following type formula:

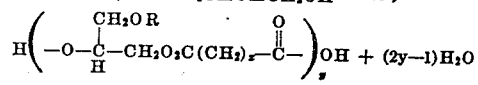

In the formula, $y$ is a finite number representing the number of units occurring in the finished ester and usually will be within a range of 5 to 50, and the end groups being either H or OH.

It has previously been indicated that the polyester may involve mixtures of two or more dibasic acids. For many purposes a mixture of a cyclic dibasic acid such as phthalic or terephthalic acid or 3,6-endomethylene-delta-4-tetrahydrophthalic acid and long chain dibasic acids are to be preferred. The long chain acids, as above indicated, should contain six or more carbon atoms and are illustrated by the group comprising adipic, sebacic, pimelic, azaleic, etc., acids. The two acids are most commonly employed in molar ratio, i. e. 1:1 but is obviously not limited to such proportions since the polyester of each of the acids is within itself, a good plasticizer of urea-formaldehyde or melamine-formaldehyde resins so that mixed esters containing the two types of dibasic acids can contain the acids in practically any conceivable ratio with respect to each other. A ratio of 95 to 5 up to 5 to 95 of either acid would appear to be entirely feasible.

The following examples are illustrative of the preparation of resins of this type which have been found to be effective as plasticizers for either urea-formaldehyde or melamine-formaldehyde resins when used as protective or decorative coatings:

*Example 1*

One hundred forty-eight grams of phthalic anhydride and 163 g. of alpha-glyceryl n-butyl ether were heated in a flask equipped with an agitator, thermometer and inert gas inlet tube. The batch was heated to 205° C. in one hour with a slow stream of inert gas flowing and then the temperature was allowed to rise slowly to 234° in about seven hours. After three hours at this temperature range, the batch was cooled and thinned to 75% solids in toluene. The product had an acid number under 10 and a viscosity of M on the Gardner-Holdt scale. The product was combined with urea-formaldehyde resin and found to be an effective plasticizer. Preferably the urea-formaldehyde resins are of the types soluble in aromatic hydrocarbons or ether alcohol solvents.

*Example 2*

Eighty-two grams of 2,6-endomethylene-delta-4-tetrahydrophthalic anhydride, 73 g. of adipic acid and 163 g. of alpha-glyceryl n-butyl ether were heated in a flask equipped as in Example 1. A slow stream of inert gas was introduced to carry off the water vapor formed. The temperature reached 160° C. in 30 minutes and rose to 230° C. during five hours. After approximately 2.7 hours at this temperature range, the resin was cooled and samples were thinned in toluene, monoethyl ether of ethylene glycol and its acetate to 50% solids and had bodies of A, B, and C, respectively, on the Gardner-Holdt scale. The acid number of the toluene solution was 6.1. This resin was found to be a particularly effective plasticizer for urea-formaldehyde resins of the above-mentioned type.

*Example 3*

Seventy-four grams of phthalic anhydride, 90 g. of alpha-glyceryl i-amyl ether, and 20 c. c. a solvent (which contains chiefly aromatic hydrocarbons and has a kauri butanol value of 90–95) were heated in a flask equipped with an agitator, thermometer, and solvent reflux system for removing water as formed. The batch was heated to 178° C. in forty minutes, held in this range for 4.6 hours, and then raised to 258° C. in the course of 1.5 hours. The product was thinned with the same solvent to 77.5% solids at which concentration it had a U body and an acid number of 6.4. The polyester was a good plasticizer of urea-formaldehyde resins, and is soluble in the non-aqueous solvents thereof.

*Example 4*

Seventy grams of phthalic anhydride, 95 g. of sebacic acid, 150 g. of alpha-glyceryl n-butyl ether, and 75 c. c. aromatic hydrocarbon solvent were heated in a flask equipped as in Example 3. The temperature was raised to 167° C. in 35 minutes and then gradually to 185° C. in 5.5 hours. Thereafter solvent was allowed to distill off and drained so that the temperature rose in 5 hours to 210° and in 1.75 more hours to 240°. The resin was cooled and thinned in the same solvent to 77.8% solids. The solution had an S body on the Gardner-Holdt scale and an acid number of 14.0.

*Example 5*

Forty-four and four tenths grams of phthalic anhydride, sixty-eight grams of alpha-glyceryl 2-ethylhexyl ether, and 40 c. c. of the above aromatic hydrocarbon solvent were heated in a flask equipped for reflux, etc., as before. The temperature was raised to 160° C. in 40 minutes and held between 160–167° C. for 5.25 hours. It was then raised in a half hour to 230° and held for two hours. The resin was cooled and thinned with the same solvent to 78.0% solids. The solution had a viscosity of Z–3 on the Gardner-Holdt scale and an acid number of 3.0.

*Example 6*

Thirty-seven grams of phthalic anhydride, 50.5 g. of sebacic acid, 97 g. of alpha-glyceryl n-hexyl ether and 60 c. c. aromatic hydrocarbon solvent were heated in a flask equipped for reflux with an agitator and thermometer. The batch was heated to 130° C. in 30 minutes and raised gradually to 180° C. in six hours, then held between 180° and 198° C. for four hours, raised to 230° C. and held about 2 hours. The product was cooled and thinned to 75% solids with the same solvent. The solution had a body of P on the Gardner-Holdt scale and an acid number of 3.0.

*Example 7*

In a similar way 74 parts of phthalic anhydride were heated with 97 parts of alpha-glyceryl n-hexyl ether and 60 c. c. of solvent. The product was thinned to 80% solids. The solution had an acid number of 8.5 and a body of W on the Gardner-Holdt scale.

The products of these examples were tested in combination with urea-formaldehyde resins in clear and pigmented finishes. They imparted flexibility and good flow properties to the finishes. The plasticizers were used in the ratios of 1:1 and 2:3 with the urea-formaldehyde resins, the ratios being based on the total solids of each constituent. The finishes had excellent heat ageing properties, good color permanence and good alkali and water resistance.

After the polyesters of alkyl alpha-glyceryl and the dicarboxylic acids have been prepared in accordance with any of the Examples 1 to 7, inclusive, or by other methods, they may be thinned with a suitable aromatic solvent such as xylene or toluene or with solvents containing a predominant proportion of aromatic compounds or with other solvents such as diacetone alcohol or monohydric ether alcohols of the type of the monoethyl or monobutyl ethers of ethylene glycol or ester type solvents such as butyl or amyl acetate in order to facilitate transfer and handling operations.

The polyesters in the solvents can be incorporated with urea-formaldehyde or melamine-formaldehyde resins of the type soluble in non-aqueous organic solvents to provide clear finishes. Of course, in many instances, it is preferred to add pigments and coloring matter such as titanium dioxide or other conventional pigments in order to give the desired color or hiding power to the solutions. The solvents are proportioned to provide solutions of any desired viscosity. The proportions of pigments admissible in a coating composition is variable and may, for example, be within a range of 10 to 60 or 70 per cent of the total film forming constituents. A ratio, for example, of 40 to 90% solvent based upon the total composition will be effective for most purposes. The solutions can be applied to surfaces to be coated by brushing or spraying or other conventional technique in films of substantially any desired thickness by application of the appropriate number of coats. The films after they have been applied can be hardened by baking under infra-red radiation or by heating in ovens at a temperature of 400° F. or thereabouts for a period of, for example, 15 minutes to 1½ hours or until the finishes have become thoroughly hardened and adherent. The finishes are of high gloss, great resistance to alkalies and greases and also to the elevated temperatures. The polyesters employed as plasticizers are practically completely nonvolatile at any ordinary temperature to which the resins are likely to be exposed.

Soluble resins of the type herein contemplated are readily obtained by condensing an amine such as urea with an aldehyde such as formaldehyde in the presence of an alcohol, such as n-butyl alcohol. The use of other alcohols capable of imparting solubility to the condensation product is contemplated.

Reference is made to applicant's application filed of even date and respectively entitled: A coating composition comprising an amide-aldehyde resin and a polyester of 2-ethyl-hexanediol-1,3 and a dicarboxylic acid as a plasticizer. Serial No. 652,806.

The forms of the invention are to be considered as exemplary. Numerous modifications can be made herein without departing from the spirit of the invention or the scope of the appended claims.

I claim:

1. A plastic composition comprising a condensation product of formaldehyde and an amide from the class consisting of urea and melamine, said resin being plasticized by means of a plastifying amount of a polyester of an alpha alkyl ether of glycerol containing 4 to 10 carbon atoms in the alkyl group and a dicarboxylic acid containing 6 to 10 carbon atoms.

2. A coating composition comprising a fluid solution of a non-aqueous solvent and a resin which is a condensation product of formaldehyde and an amide of a class consisting of urea and melamine, said solution also containing a plastifying amount for the resin of a polyester of an alpha-alkyl ether of glycerol containing 4 to 10 carbon atoms in the alkyl group and a dicarboxylic acid containing 6 to 10 carbon atoms.

3. A coating composition comprising a fluid solution of a non-aqueous solvent and a resinous condensation product of formaldehyde and an amide of a class consisting of urea and melamine, said solution also containing a plastifying amount for said product of a polyester of an alpha-alkyl ether of glycerol containing 4 to 10 carbon atoms in the alkyl group and a dicarboxylic acid containing 6 to 19 carbon atoms.

4. A coating composition comprising a fluid solution of a non-aqueous solvent and a resinous condensation product of formaldehyde and an amide of a class consisting of urea and melamine, said solution also containing a polyester of an alpha-butyl ether of glycerol and a dicarboxylic acid containing 6 to 10 carbon atoms in a plastifying amount for the resinous condensation product.

5. A coating composition comprising a fluid solution of a non-aqueous solvent and a resinous condensation product of formaldehyde and an amide of a class consisting of urea and melamine, said solution also containing a polyester of an alpha-butyl ether of glycerol and a dicarboxylic acid containing 6 to 19 carbon atoms in an open chain in a plastifying amount for the resinous condensation product.

6. A coating composition comprising a fluid solution of a non-aqueous solvent and a resinous condensation product of formaldehyde and an amide of a class consisting of urea and melamine, said solution also containing a mixed polyester of an alpha-alkyl ether of glycerol containing 4 to 10 carbon atoms in the alkyl group and a mixture of an open chain dicarboxylic acid containing 6 to 19 carbon atoms and phthalic acid in a plastifying amount for the resinous condensation product.

7. A plastic composition comprising a condensation product of urea and formaldehyde, said resin being plasticized by means of a polyester of an alpha-alkyl ether of glycerol containing 4 to 10 carbon atoms in the alkyl group and a dicarboxylic acid containing 6 to 19 carbon atoms, the polyester being in a proportion with respect to the resin within a range of 1:1 to 2:3.

8. A coating composition comprising a fluid solution of a non-aqueous solvent and a resin which is a condensation product of urea and formaldehyde, said solution also containing as a compatible plasticizer of the resin, a polyester of an alpha-alkyl ether of glycerol containing 4 to 10 carbon atoms in the alkyl group and a dicarboxylic acid containing 6 to 19 carbon atoms, the ratio of plasticizer to resin being within the range of 1:1 to 2:3.

9. A coating composition comprising a fluid solution of a non-aqueous solvent and a resinous condensation product of urea and formaldehyde, said solution also containing in a plastifying amount for said product, a polyester of an alpha-alkyl ether of glycerol in which the alkyl group contains 4 to 10 carbon atoms and a dicarboxylic acid containing 6 to 19 carbon atoms.

10. A coating composition comprising a fluid solution of a non-aqueous solvent and a resinous condensation product of urea and formaldehyde, said solution also containing in a plastifying amount for said product, a polyester of an alpha-butyl ether of glycerol and a dicarboxylic acid containing 6 to 10 carbon atoms.

11. A coating composition comprising a fluid solution of a non-aqueous solvent and a resin which is the same as a resinous condensation product of urea and formaldehyde, said solution also containing in a plastifying amount for said product, a polyester of an alpha-butyl ether of glycerol and a dicarboxylic acid containing 6 to 19 carbon atoms in an open chain.

12. A plastic composition comprising a resin which is a condensation product of melamine and formaldehyde, said resin containing a plastifying amount of a polyester of an alpha-alkyl ether of glycerol containing 4 to 10 carbon atoms and a dicarboxylic acid containing 6 to 19 carbon atoms.

13. A coating composition comprising a fluid solution of a non-aqueous solvent and a resin which is a condensation product of melamine and formaldehyde, said solution also containing a plastifying amount for the resin of a polyester of an alpha-alkyl ether of glycerol containing 4 to 10 carbon atoms in the alkyl group and a dicarboxylic acid containing 6 to 19 carbon atoms.

14. A coating composition comprising a fluid solution of a non-aqueous solvent and a resinous condensation product of melamine and formaldehyde, said solution also containing a plastifying amount for said product of a polyester of an alpha-butyl ether of glycerol and a dicarboxylic acid containing 6 to 19 carbon atoms in an open chain.

15. A coating composition comprising a fluid solution of a non-aqueous solvent and a resinous condensation product of melamine and formaldehyde, said solution also containing a plastifying amount for said product of a polyester of an alpha-butyl ether of glycerol and a dicarboxylic acid containing 6 to 10 carbon atoms.

16. A coating composition comprising a fluid solution of a non-aqueous solvent and a resinous condensation product of melamine and formaldehyde, said solution also containing a plastifying amount for said product of a mixed polyester of an alpha-alkyl ether of glycerol containing 4 to 10 carbon atoms in the alkyl group and a mixture of an open chain dicarboxylic acid containing 6 to 19 carbon atoms and phthalic acid.

17. A plastic composition comprising a resin which is a condensation product of urea and formaldehyde, said resin containing a plastifying amount of a polyester of an alpha-alkyl ether of glycerol and phthalic acid, the alkyl groups containing 4 to 10 carbon atoms.

18. A plastic composition comprising a resin which is a condensation product of urea and formaldehyde, said resin being plasticized with a polyester of an alpha-alkyl ether of glycerol and phthalic acid, the alkyl groups containing 4 to 10 carbon atoms, the range of proportions of the polyester to the resin being from 1:1 to 2:3.

19. A plastic composition comprising a resinous condensation product of urea and formaldehyde and a plastifying amount of a mixed polyester of a mono-alkyl ether of glycerol and a mixture of an open chain dicarboxylic acid containing 6 to 19 carbon atoms and phthalic acid, the proportion of the polyester with respect to the resin being within a range of 1:1 to 2:3.

EUGENE W. MOFFETT.

REFERENCES CITED

The following references are of record in the file of this patent:

UNITED STATES PATENTS

| Number | Name | Date |
| --- | --- | --- |
| 2,115,700 | Anderson | May 3, 1938 |